March 24, 1959   F. HAMM   2,878,885
EMERGENCY VEHICLE BRAKE DEVICE
Filed July 24, 1957
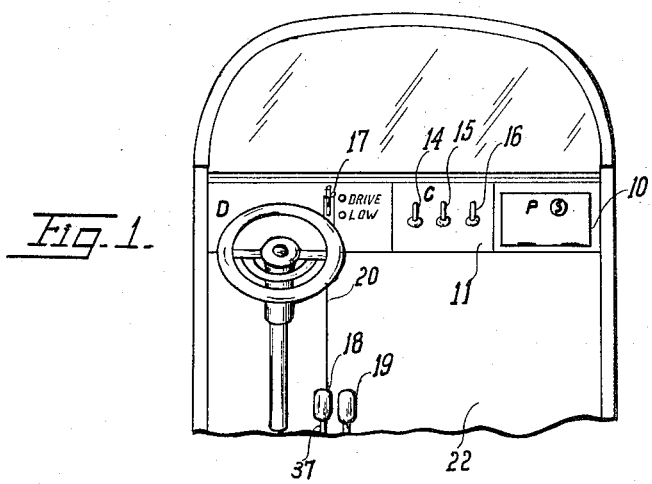
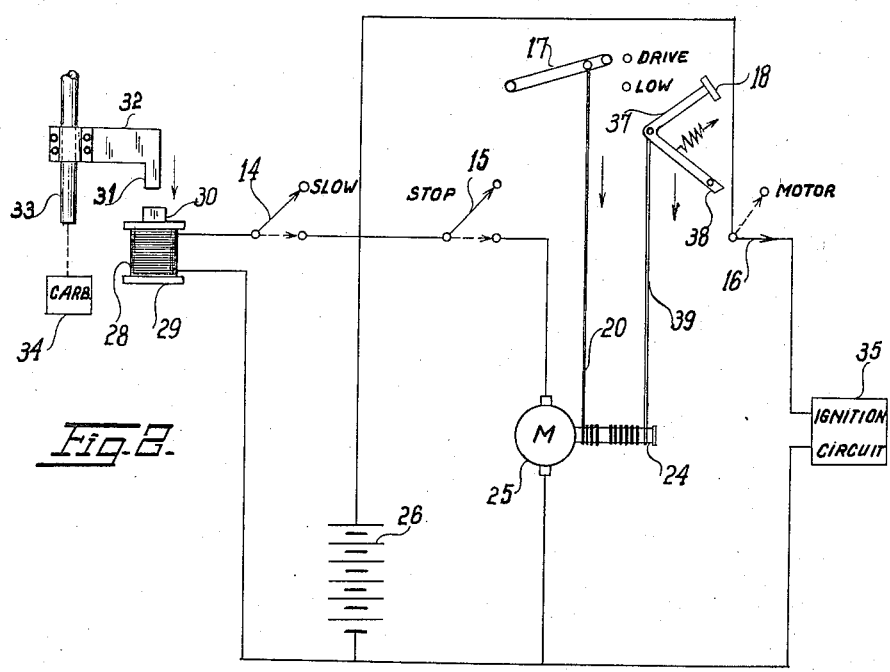
INVENTOR.
Fred Hamm
BY
ATTORNEY.

United States Patent Office 2,878,885
Patented Mar. 24, 1959

2,878,885
EMERGENCY VEHICLE BRAKE DEVICE

Fred Hamm, Milwaukee, Wis.

Application July 24, 1957, Serial No. 673,881

2 Claims. (Cl. 180—82)

This invention relates to safety devices for vehicles.

It is a principal object of the invention to provide in an automotive vehicle means for selectively turning off the engine, applying the brakes, disengaging the shift mechanism, and turning off the fuel supply to the engine, in case of accident, or in the event the usual controls of the vehicle become inoperative.

Another object is to provide supplemental controls for a vehicle operable by a passenger independent of the controls operated by the driver.

Another object is to provide manually controlled switch means for slowing and stopping a vehicle and for stopping the engine thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a dashboard of an automobile provided with a switch control board according to the invention.

Fig. 2 is a diagram of the electrical and mechanical features of the invention.

Referring to Fig. 1, there is shown a dashboard 10 of an automotive vehicle V. This vehicle could be an automobile, truck, bus, or the like, operated by a driver in the driver's position D. Position P, adjacent to the driver, may be a passenger's position. Centrally located on the dashboard 10 in position C is a panel 11 on which, in an alinged array, are switches 14, 15 and 16. The vehicle may be one provided with an automatic shift mechanism having a control lever 17 on the dashboard conveniently placed for operation by the driver at position D. Brake pedal 18 and gas pedal 19 are also conveniently located for operation by the driver. Attached to the shaft lever 17 is a cable 20, which extends through the floor board 22.

In Fig. 2 the cable 20 is shown engaged on the shaft 24 of a motor 25. When the cable is wound on the shaft the lever may be moved from the Drive position to the Low position, so that the decelerated engine may serve to assist in braking the wheels. Motor 25 is in series circuit with the battery 26 and Stop switch 15. This switch, as well as each of switches 14 and 16, is a single pole single throw control having its handle conveniently located with respect to the driver and passenger positions D and P. The Slow switch 14 is in series circuit with a coil 28 of an electromagnet 29 and with battery 26. The pole piece 30 of the electromagnet is located so as to attract arm 31 on bracket 32. This bracket is secured to the fuel control rod 33 of the vehicle. The rod 33 terminates in conventional fashion at the carburetor 34, to control the intake of fuel therein. Motor switch 16 is in series circuit with the conventional ignition circuit 35 of the vehicle and with battery 26. The brake lever 37 pivots on pin 38. Secured to lever 37 is another cable 39 which is also wound on shaft 24.

In operation of the device, switches 14 and 15 are normally open and switch 16 is closed. In the event of an accident or other compelling emergency when the operation of the regular brake, fuel and ignition controls may not be possible, the driver or a passenger throws one or more of the switches 14, 15, 16. Upon the closing of switch 14, the electromagnet will become energized to attract arm 31 which causes the rod 33 to be pulled in such a direction that the fuel supply to the engine is reduced to a minimum amount. This will cause the vehicle to slow down. If switch 15 is also or alternatively closed, motor 25 will wind up the cables 20 and 39 so that lever 17 is moved from Drive to Low gear position and the engine assists in braking the wheels. At the same time, the brakes are applied as cable 39 pulls lever 37 to a brake actuating position, to stop the movement of the vehicle. Upon actuation of normally closed switch 16 the electrical supply to ignition circuit 35 is broken and the motor is stopped. This stopping of the motor assists in retarding the motion of the wheels. Also, the stopping of the engine reduces any fire hazard which might be present in the emergency situation.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letter Patent is:

1. In a vehicle provided with an automatic shifting device operated by a manually movable shift lever, a braking means operated by a brake pedal and a fuel system operated by a gas pedal, a safety device for slowing and stopping the vehicle in an emergency, comprising a panel, said panel being located in a position accessible to a driver and a passenger in the vehicle, a plurality of manually controllable switches mounted on the panel, a battery, an electromagnet, a motor, said battery and electromagnet being connected in series circuit with one of the switches to define a first control circuit, a bracket having an arm movable by said electromagnet upon actuation of the first switch, a fuel control rod, said bracket being secured to said fuel control rod in the vehicle so that the fuel supply to the engine of the vehicle is reduced upon manual actuation of the first switch independently of foot operation of the gas pedal, said battery and motor being connected in series circuit with another of the switches to define a second control circuit, said motor having a shaft, and a pair of cables engaged on said shaft, one of said cables being attached to the shift lever in the vehicle, a brake lever, the other of said cables being attached to the brake lever in the vehicle, whereby the brake and shift levers are moved upon manual actuation of said other switch to stop the vehicle independently of hand operation of the shift lever and foot operation of the brake pedal.

2. In a vehicle provided with an automatic shifting device operated by a manually movable shift lever, a braking means operated by a brake pedal, a fuel system operated by a gas pedal and an ignition system including an ignition circuit, a safety device for slowing and stopping the vehicle in an emergency, comprising a panel, said panel being located in a position accessible to both a driver and a passenger in the vehicle, a plurality of manually controllable switches mounted on the panel, a battery, an electromagnet, a motor, said battery and electromagnet being connected in series circuit with one of the switches to define a first control circuit, a bracket having an arm movable by said electromagnet upon actuation of the first switch, a fuel control rod, said bracket being secured to said fuel control rod in the vehicle so that the fuel supply to the engine of the vehicle is reduced upon manual actuation of the first switch independently of foot operation of the gas pedal, said battery and motor being connected in series circuit with another of the switches to define a second control circuit, said motor having a shaft, and a pair of cables engaged on said shaft, one of said cables being attached to the shift lever in the vehicle, a brake lever, the other of said cables being attached to the brake lever in the vehicle, whereby the brake and shift levers are moved upon manual actuation of said other switch to stop the vehicle independently of hand operation of the shift lever and foot operation of the brake pedal, said battery being connected in series with a third of said switches and with said ignition circuit of the vehicle to define a third control circuit, said third switch being effective upon manual operation thereof to interrupt the electrical supply to said ignition circuit from the battery and stop the engine in the vehicle.

References Cited in the file of this patent

UNITED STATES PATENTS

| | | |
|---|---|---|
| 1,893,833 | Apple | Jan. 10, 1933 |
| 2,247,368 | Gindele | July 1, 1941 |

FOREIGN PATENTS

| | | |
|---|---|---|
| 377,927 | Italy | Jan. 15, 1940 |